US005518258A

United States Patent [19]

Cox

[11] Patent Number: 5,518,258

[45] Date of Patent: May 21, 1996

[54] PORTABLE WORKSTATION

[76] Inventor: Daryl Cox, 5616 Harvard Dr., San Jose, Calif. 95118

[21] Appl. No.: 143,360

[22] Filed: Oct. 26, 1993

[51] Int. Cl.[6] .......... B60F 5/00; B62G 1/12

[52] U.S. Cl. .......... 280/30; 280/47.19; 280/47.33; 108/134; 312/249.13; 312/314

[58] Field of Search .......... 280/30, 652, 47.18, 280/47.19, 47.26, 47.33, 47.24, 651; 108/42, 48, 134; 312/249.13, 277, 313, 314

[56] References Cited

U.S. PATENT DOCUMENTS

| | | | |
|---|---|---|---|
| D. 182,926 | 5/1958 | Roeder | 280/47.19 X |
| D. 338,306 | 8/1993 | White et al. | 280/47.18 X |
| 1,149,639 | 8/1915 | Doust, Jr. | 280/47.19 X |
| 1,227,536 | 5/1917 | Hartman | 312/314 X |
| 1,828,248 | 10/1931 | Hallowell et al. | 280/47.19 X |
| 2,233,003 | 2/1941 | Epps | 312/277 X |
| 2,555,178 | 5/1951 | Young . | |
| 2,580,618 | 1/1952 | Terrell | 108/134 X |
| 2,603,500 | 7/1952 | Messier | 280/30 |
| 2,668,977 | 2/1954 | Reece | 280/47.19 X |
| 2,883,731 | 4/1959 | Wells . | |
| 2,964,328 | 12/1960 | Muir . | |
| 2,969,830 | 1/1961 | Thompson | 280/30 X |
| 3,118,685 | 1/1964 | Jordan . | |
| 3,413,663 | 12/1968 | Swann | 280/648 X |
| 3,873,114 | 3/1975 | Brown | 280/30 |
| 4,070,075 | 1/1978 | Morgan | 312/249.13 |
| 4,856,435 | 8/1989 | Larson | 108/48 X |
| 4,865,346 | 9/1989 | Carlile . | |
| 5,013,055 | 5/1991 | Labrum . | |
| 5,154,441 | 10/1992 | White et al. | 280/652 X |

FOREIGN PATENT DOCUMENTS

| | | | |
|---|---|---|---|
| 32840 | 10/1964 | Germany | 280/30 |
| 219771 | 8/1924 | United Kingdom | 312/313 |

*Primary Examiner*—Brian L. Johnson

[57] ABSTRACT

A compact portable workstation designed for the tradesman and equally for the home person. In closed position, the workstation is small enough to transport by car. In open position, the workstation provides an enormous uniquely inviting work space and is inviting to perform almost any task upon. The workstation totes like an upright dolly and features two independent work surfaces (46,50) each which hinge atop the workstation and have folding legs (48,52) opposite hinges (54). Work surfaces (46,50) boast a size of 51×69 cm. and 51×74 cm. while the station base (8) is 31×41×84 cm. high. A middle leaf of the extended work surface doubles as a collapsible stool (38) which is 31×41 cm.×36 cm. high. Full work surface length is 173 cm. Station base appropriately is designed to house heavier, bulky items in a bottom bin and by virtue of the two walled simplistic design structure, is easy to access bulky items. Similarly, three storage drawers (28) also access from two sides. Convenience pouches (32) are also provided and hang aside storage drawers (28). These can also be hung directly under either side of both work surfaces. Atop the workstation is an upper bin which has an open top. Stool (38) is stored here and as stated above functions as middle leaf. Legs (42) of stool (38) and work surfaces (48,52) are the same design but different material. These legs are U shaped and pivot on stationary braces (40,58) and have collapsing hinges (44,56) to obtain stability. Closed work surface legs (48,52) are hidden, except the ends which function as handles (64,66) to control the workstation while in transit.

2 Claims, 9 Drawing Sheets

PORTABLE WORKSTATION

BACKGROUND-FIELD OF INVENTION

This invention relates to portable tables, storage units and stools.

1. Background Description of Prior Art

Several relevant prior art references are offered. Most similar to my work station is a mobile combination tool chest and workbench, U.S. Pat. No. 3,118,685 dated Jan. 21, 1964 to Jordan. While being a portable tool carrier and workbench, it lacks storage capacity, a practical work surface and does not include a stool. The absence of a unit including the afore mentioned features in the current market constitutes a genuine need in the home or work place. A portable workstation meets this need by offering adequate storage capacity, an included stool, and spacious work surface.

2. Objects and Advantages

Several objectives and advantages of a workstation are providing a portable storage and work surface unit with a stool where none existed before. The workstation enables one to work at a much faster pace than with previously patented inventions. By virtue of the workstation's unique design and capabilities, one can use the workstation with ease and convenience in almost any location and field of work. Combining commonly used devices in a single portable unit, the workstation's simplistic function and portability create a multi-purpose device that is useful to a broader spectrum of people and their needs. Further objectives and advantages of the workstation will become apparent from a consideration of the drawings and the following description.

REFERENCE NUMERALS IN DRAWINGS

Figure 1:
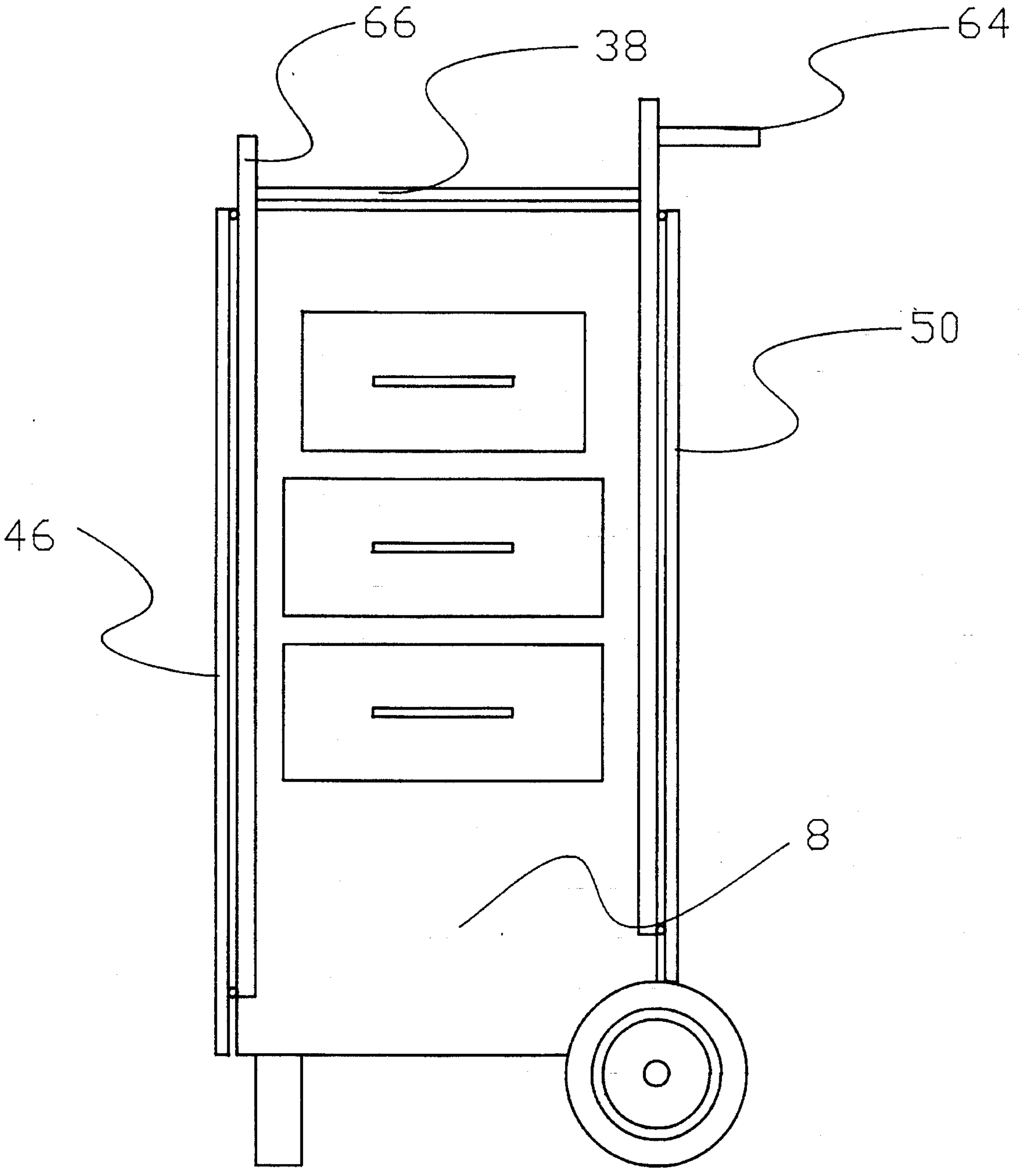
FIG. 1 is a left side elevation view of workstation while closed. Left and right are always symmetrical.

8 station base
10 wheels [two]
12 axle
14 feet [two]
16 lower storage bin shelf
18 lower bin retaining ledge
20 structural shelf

22 right and left structural walls with cutouts
24 upper storage bin shelf
26 upper storage bin front and rear wall members
28 storage drawers [three]
30 storage drawers support rails [four]
32 hanging convenience pouches [two]
34 pouch hooks
36 auxiliary pouch hooks
38 combination stool/work surface leaf
40 stool legs braces [four]
42 stool U legs [two]
44 collapsing hinges for stool legs [four]
46 front work surface
48 front work surface U legs
50 rear work surface
52 rear work surface U legs
54 front and rear work surface hinges [four]
56 collapsing hinges
58 work surface legs braces [four]
60 structural legs braces[two]
62 work surface closure spring locks
64 primary handles [two]
66 auxiliary handles [two]
68 station base notches

DESCRIPTION OF INVENTION

Note: All indicated rear parts on drawings are symmetrical to counterparts.

Figure 7:
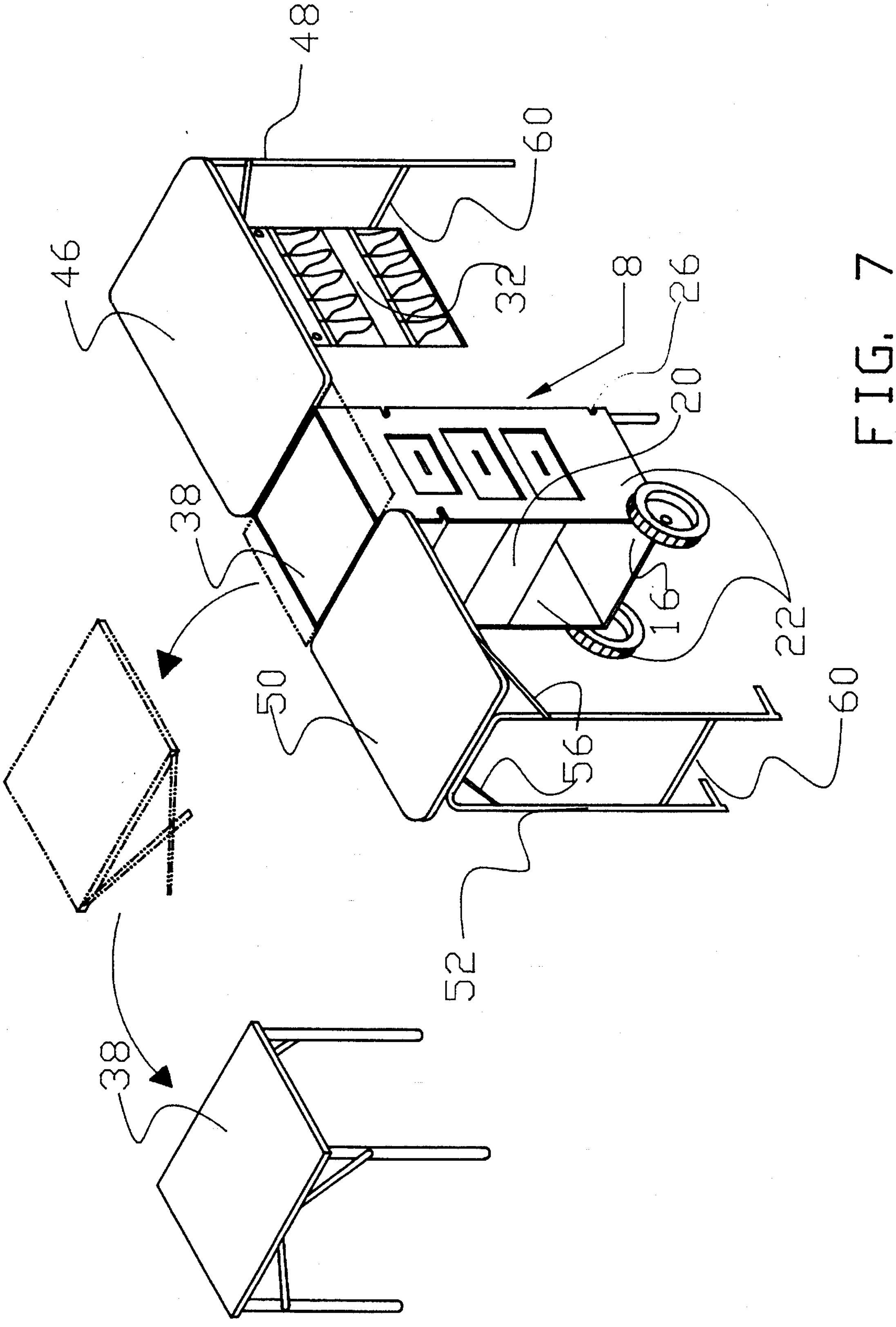
FIG. 7 is an isometric view from top to front side of workstation while fully open.
Figure 8:
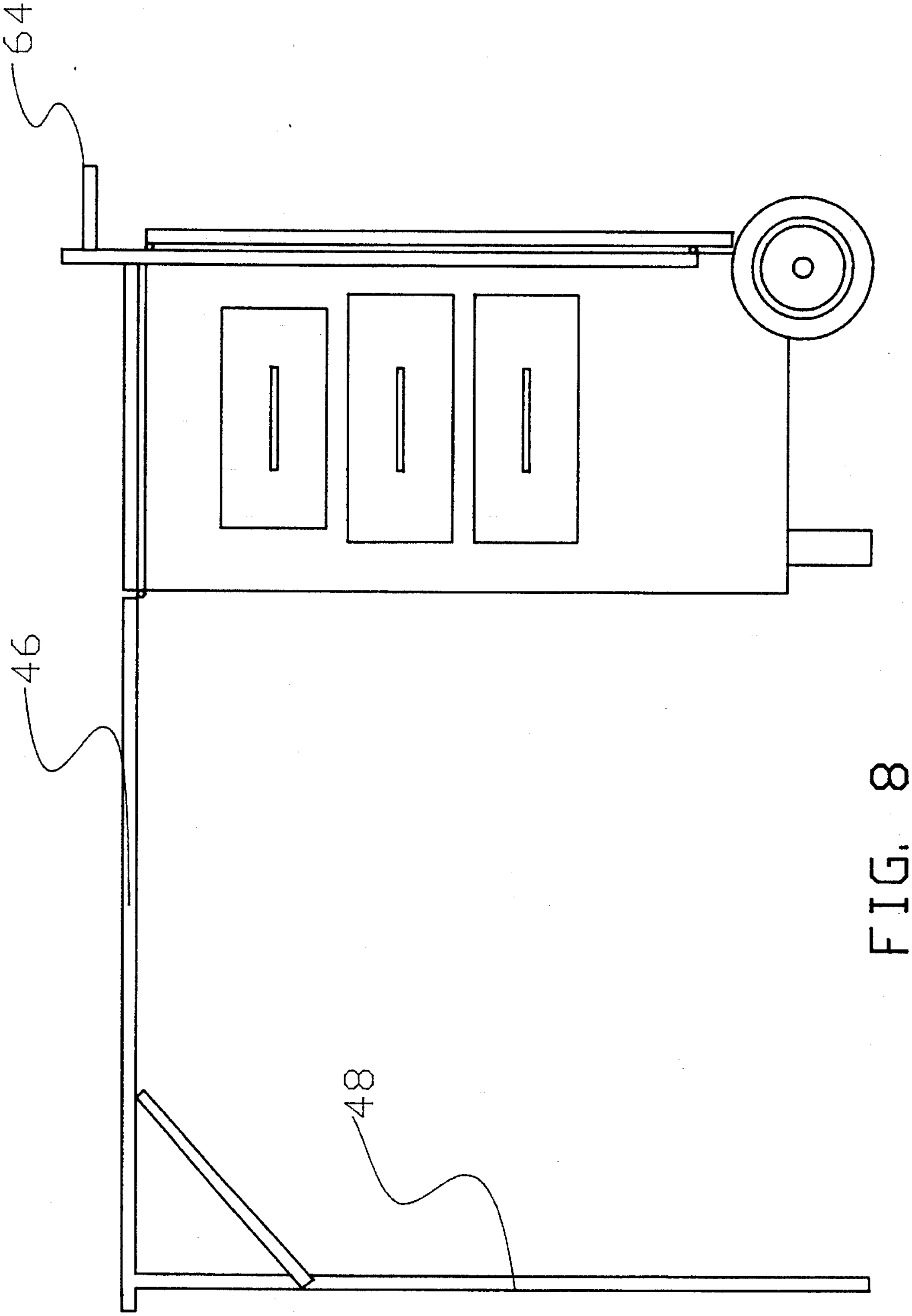
FIG. 8 is a right side view of the workstation while partially open toward the front.
Figure 9:
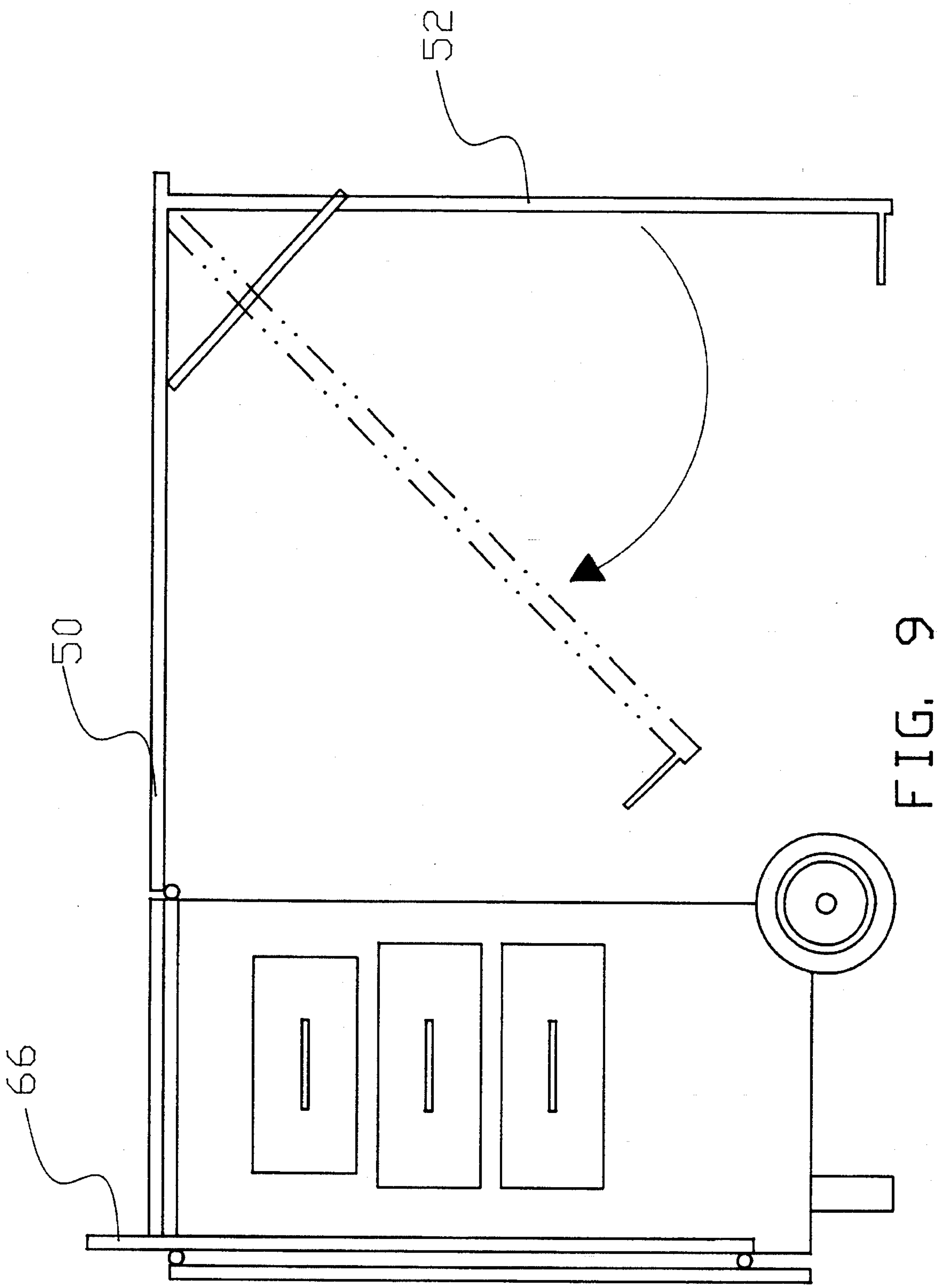
FIG. 9 is a right side view of the workstation while partially open toward the rear.
Figure 10:
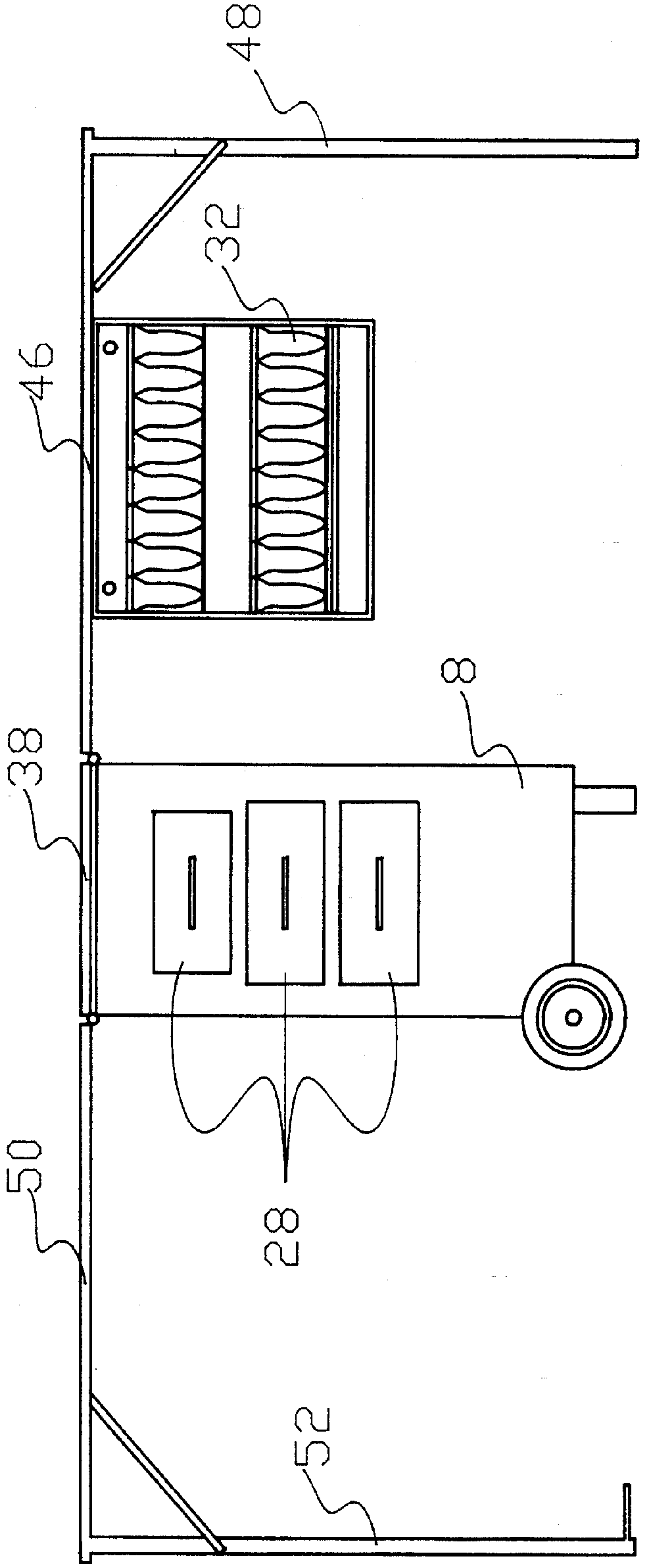
FIG. 10 is a left side view of the workstation while fully opened.

Referring to FIG. 7, a workstation has a station base 8.

Figure 2:
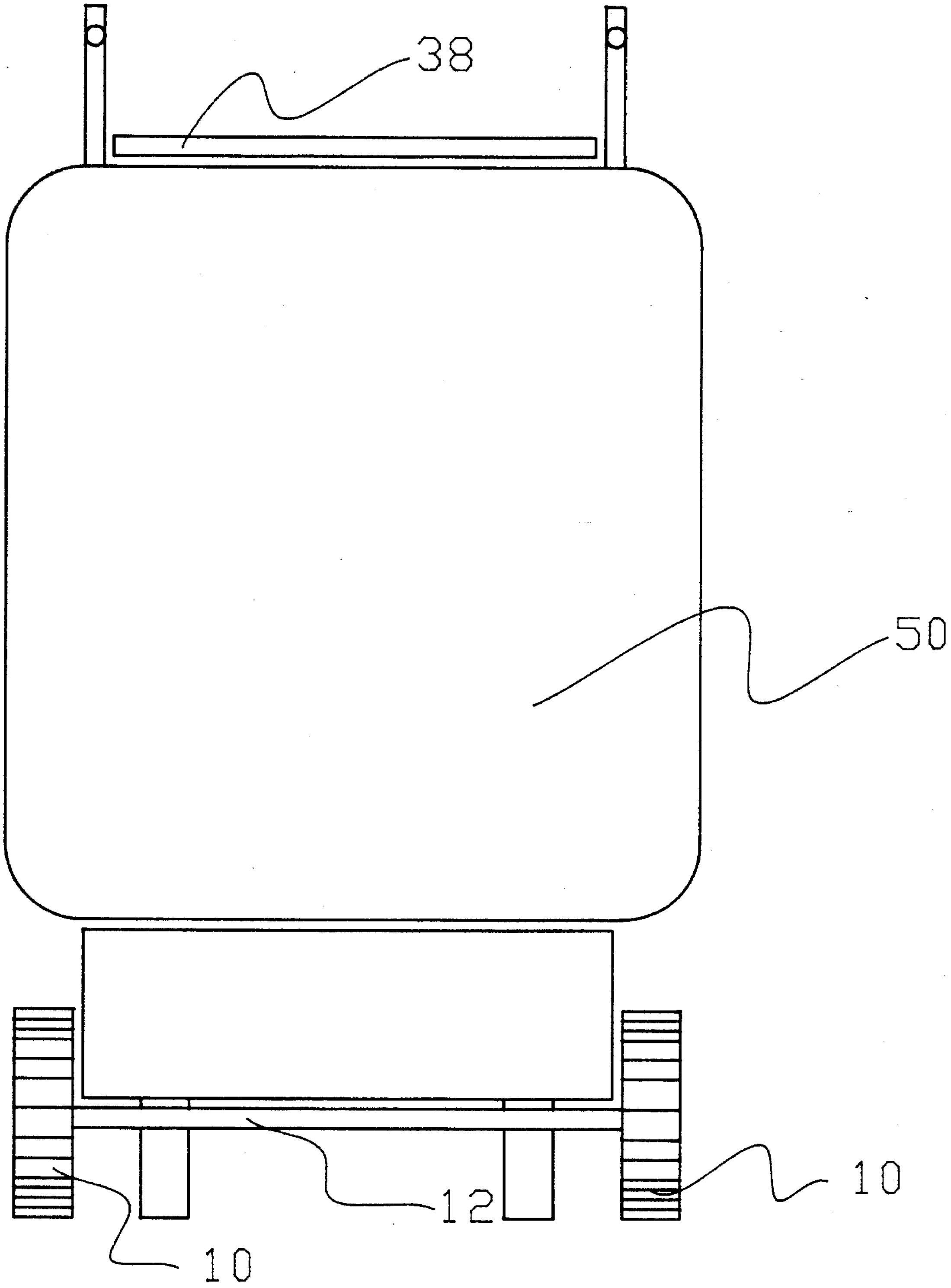
FIG. 2 is a rear elevation view of workstation while closed.

Referring to FIG. 2, an axle 12 mounts under rear of station base 8 supporting two wheels 10.

Figure 5:
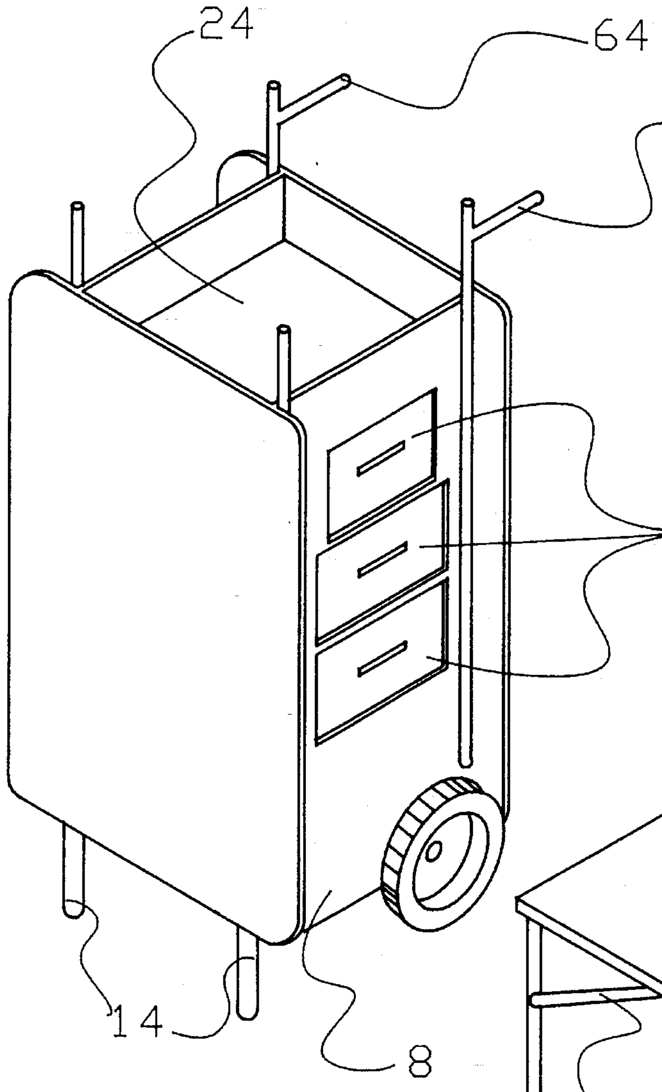
FIG. 5 is an isometric view from the top to front side of workstation while closed, work surface leaf removed.

Referring to FIG. 5, two feet 14 mount under front of station base 8.

Figure 3:
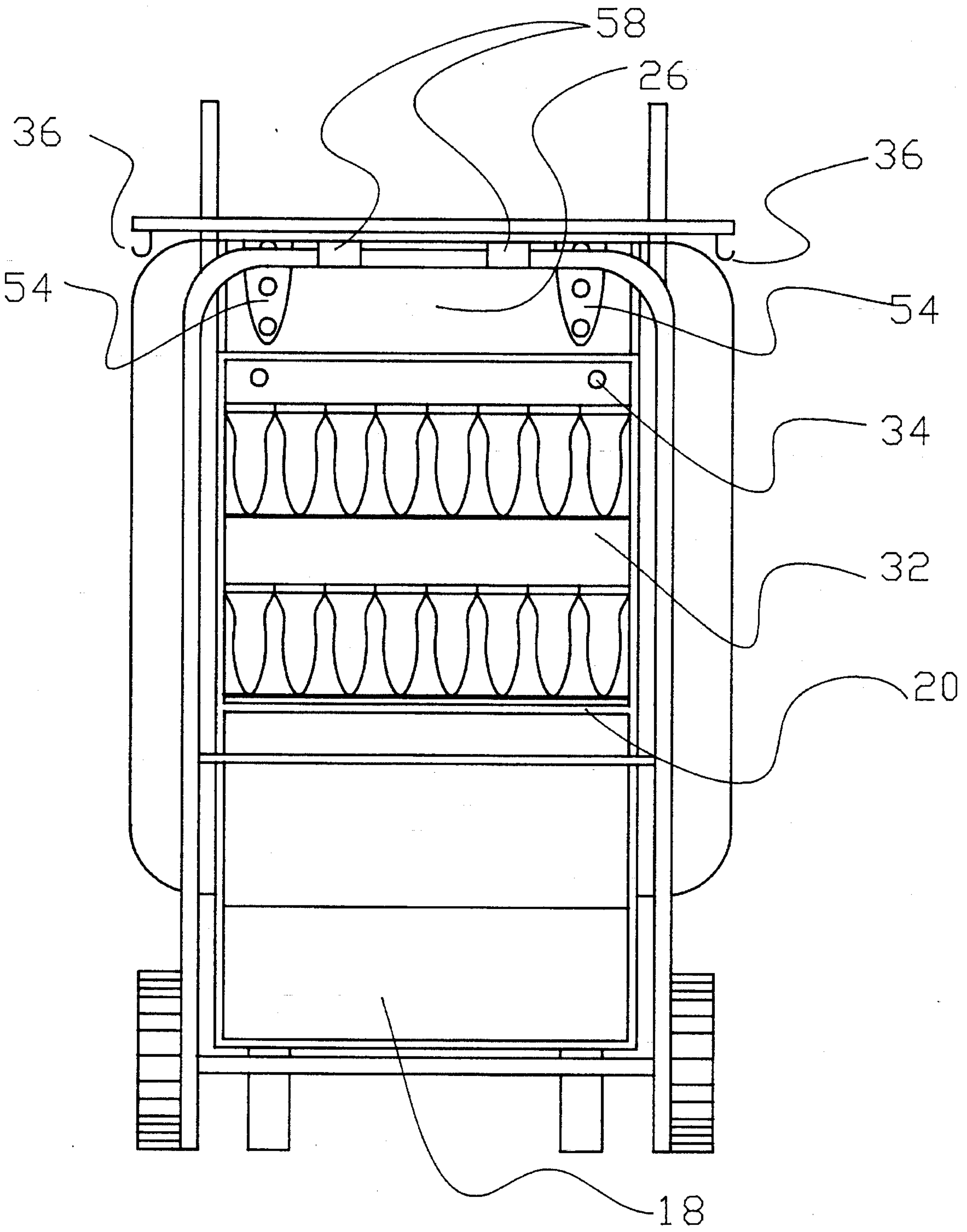
FIG. 3 is a rear elevation view of workstation while open.
Figure 4:
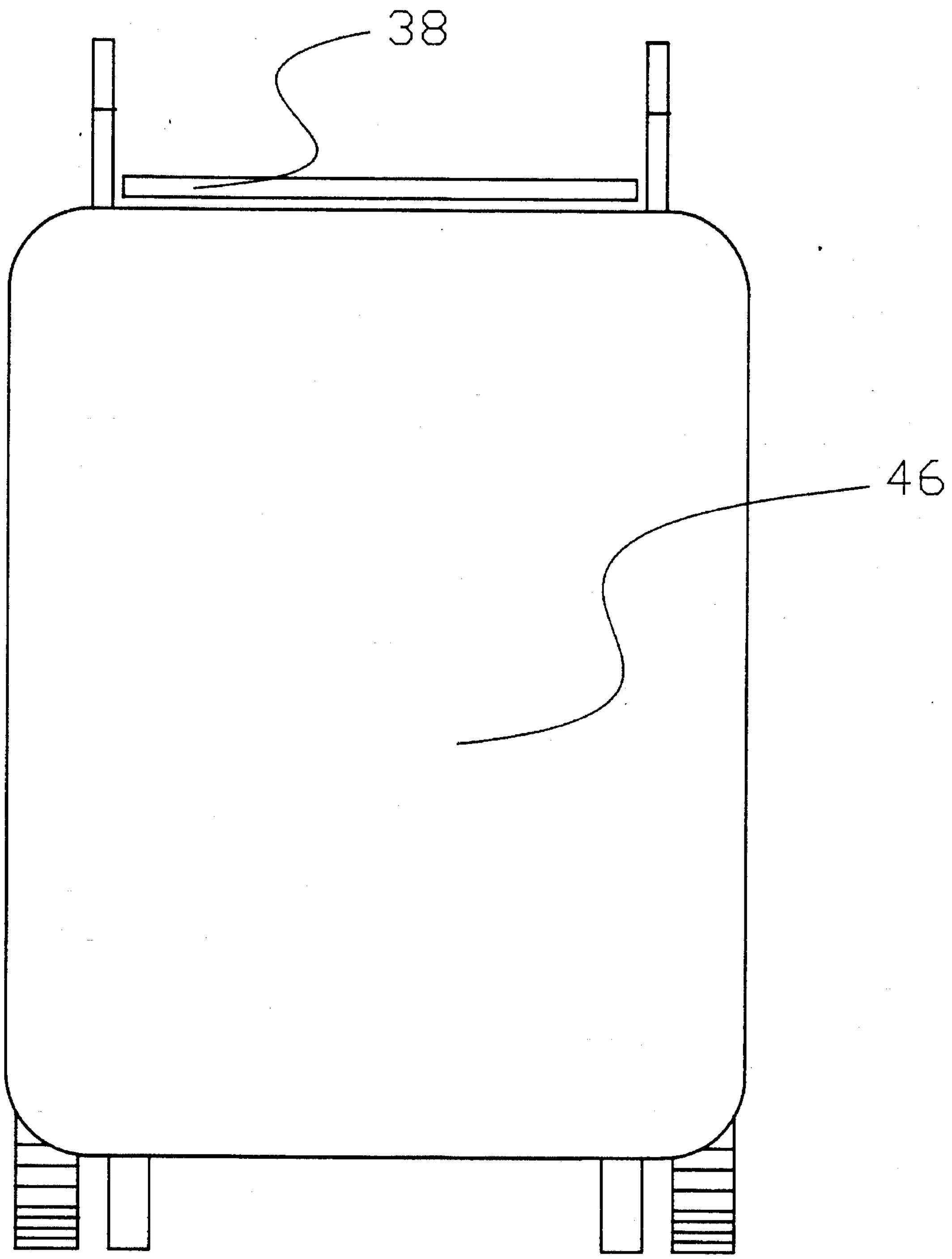
FIG. 4 is a front elevation view of workstation while closed.

Referring to FIG. 3 and 7, station base 8 structurally comprises of right and left structural walls 22 each having three cutouts to house three storage drawers 28. Structural walls 22 are supported by a lower storage bin shelf 16.

Referring to FIG. 3, also supporting structural walls 22 is a structural shelf 20.

Referring to FIG. 5, an upper storage bin shelf 24 lastly supports structural walls 22.

Referring to FIG. 3 and 7, a lower bin retaining ledge 18 mounts above shelf 16. At middle, suspended between walls 22 are four storage drawers support rails 30. Convenience pouches 32 hang by hooks 34 on the front and rear underside of upper storage bin shelf 24. Work surfaces 46 and 50 while open also have auxiliary pouch hooks 36 on underside. At top of station base 8 are two upper storage bin front and rear wall members 26 which join atop shelf 24 and between walls 22. Front and rear work surface hinges 54 mount two each on faces of wall members 26. A front work surface 46 shares front hinges 54. Respectively, a rear work surface 50 shares rear hinges 54. Moving outward to underside end of work surface 46 and symmetrically to work surface 50 are four work surface leg braces 58. Braces 58 mount front work surface U legs 48 and rear work surface U legs 52. Collapsing hinges 56 for work surface U legs 52 are mounted, two on the underside of work surface 46 and outside of legs 48. Remaining two respectively between the underside of work surface 50 and outside of legs 52. Structural legs braces 60 reinforce legs 48 and 52. Work surface closure spring locks [not shown] secure work surfaces 46,50 in closed positions. Respectively, legs 48,52 fit into station base notches 68.

Figure 6:
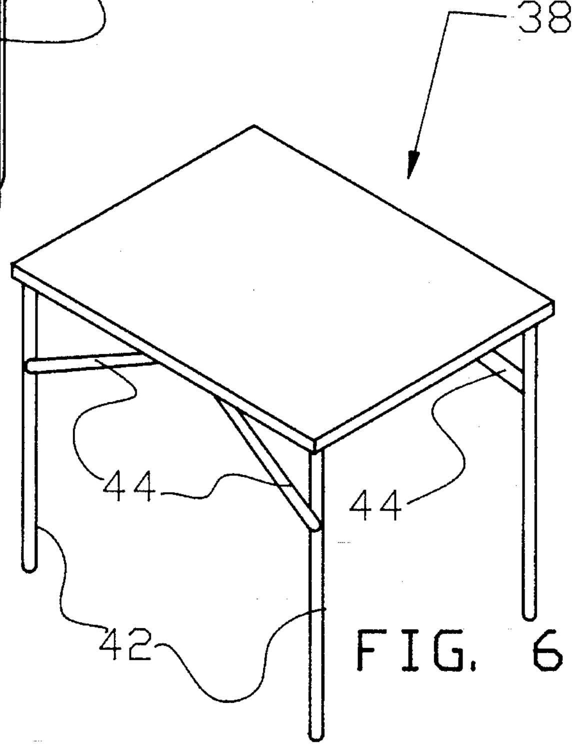
FIG. 6 is an isometric view from the top to front side of work surface leaf in freestanding stool form.

Referring to FIG. 6, a combination stool/work surface leaf 38 under which are four stool legs braces 40, two each on opposite ends and mount two stool U legs 42. Collapsing hinges for stool legs 44 are mounted underside of stool 38 and on outside of legs 42.

Referring to FIG. 5, are two primary handles 64 which are ends of rear work surface U legs 52.

OPERATION OF INVENTION

Workstation is toted on two wheels 10 and is hand propelled by using two primary handles 64. Primary and auxiliary handles 66 enable one to lift workstation from any side.

To open the workstation, one simply pulls out on bottom half of either work surfaces 46,50, disengaging spring locks 62 and guides down work surface U legs 48,52 into place. To lock, two of collapsing hinges 56 are set with a push. Remaining work surface 46 and U legs 48 work identically leaving work surfaces 46,50 at this point fully extended spanning 173 cm.

Removing combination stool/work surface leaf 38 reveals upper storage bin shelf 24. Opening stool 38 works identical to work surfaces 46,50. Simply pull out stool legs 42 and engage collapsing hinges 44 with a push.

Under upper storage bin shelf 24 on front and rear side are two hanging convenience pouches 32 which can be lifted and rehung on underside of work surfaces 46,50. Storage drawers 28 are independently lifted and pulled out either side of right or left structural walls with cutouts 22. Support rails 30 and structural shelf 20 are slightly lower than cut outs to obtain locked drawers positions. Lower storage bin 16 is fully open on front and rear sides excepting ledge 18 which serves as a partial wall. Notches 68 are provided on station base 8 as needed to provide snug closure of work surfaces 46,50, legs 48,52 and rigidness of handles 64,66.

Rear work surface 50 is slightly shorter than front work surface 46 to provide clearance for wheels 10 when closed. Consequently, rear work surface U legs 52 closed position is higher and results in higher primary handles 64 for transport. This along with feet 14, wheels 10 and ledge 18 leaves remaining elements symmetrical from front to rear and right to left.

SUMMARY, RAMIFICATIONS AND SCOPE

Accordingly, the workstation provides convenience and encourages expediency to the work person. This along with simplistic and unique design enables one to work virtually anywhere and makes simple or complicated tasks easier to accomplish.

Although not mentioned before, the workstation was conceived out of a need to relieve back stress. Being a therapeutic concept, a workstation's far reaching conveniences are attributed to:

eliminating constant bending over to pick up tools, materials, etc.;

eliminating numerous trips to gather tools and materials;

enabling simple tasks to be performed at a desirable working height;

providing a dolly type design which enables easy, convenient transport of tools and materials without lifting.

Although the description above contains many specificities, these should not be construed as limiting the scope of the workstation, but as merely providing illustrations of some of the presently preferred embodiments of the workstation. For example: the design concept allows the workstation to be made in various sizes and a variety of materials. Also, contents have potential for different configurations. The workstation can adapt to different fields of work such as: gardening, kitchen aid, laundry, automobile, hobby, commercial, handyman, etc..

I claim:

1. A convertible and portable workstation comprising:

an upright station base having front, rear, right and left sides, a top, bottom and a plurality of central shelves located on the station base, each shelf including a storage bin thereon and the bottom having a pair of wheels attached thereto to provide mobility;

a work surface hingedly connected to a top portion of the front and rear sides of the station base, each work surface including a pivotally collapsible U-shaped leg support at each outward end thereof, each U-shaped leg support pivotal from a first collapsed position substantially parallel to both the station base and the work surface to a second extended position substantially perpendicular to the work surface so as to support the work surface in an outwardly extended, horizontal orientation;

each U-shaped leg support comprising a pair of spaced leg members, one end of the leg members being joined together as well as pivotally attached to the outward end of the work surface and the opposite end of the leg members comprising a handle gripping portion thereon adapted to be grasped by a user in the first collapsed position to maneuver the station base on the pair of wheels and the opposite end of the leg members further providing a ground engaging support for stability of the workstation when in the second extended position.

2. The convertible and portable workstation of claim 1 further comprising a work surface leaf removably mounted to the top of the station base, a plurality of folded legs attached to a bottom surface of the leaf such that the leaf is removable from the station base and with the legs unfolded, provides a stool for the user.

* * * * *